Dec. 22, 1970 J. S. CHRISTIE 3,549,264
INSTRUMENT FOR MEASURING THE GEOMETRIC ATTRIBUTES OF
METALLIC APPEARANCE BY MEASURING LIGHT REFLECTED AT
VARIOUS ANGLES FROM A SURFACE
Filed Nov. 13, 1968 3 Sheets-Sheet 1
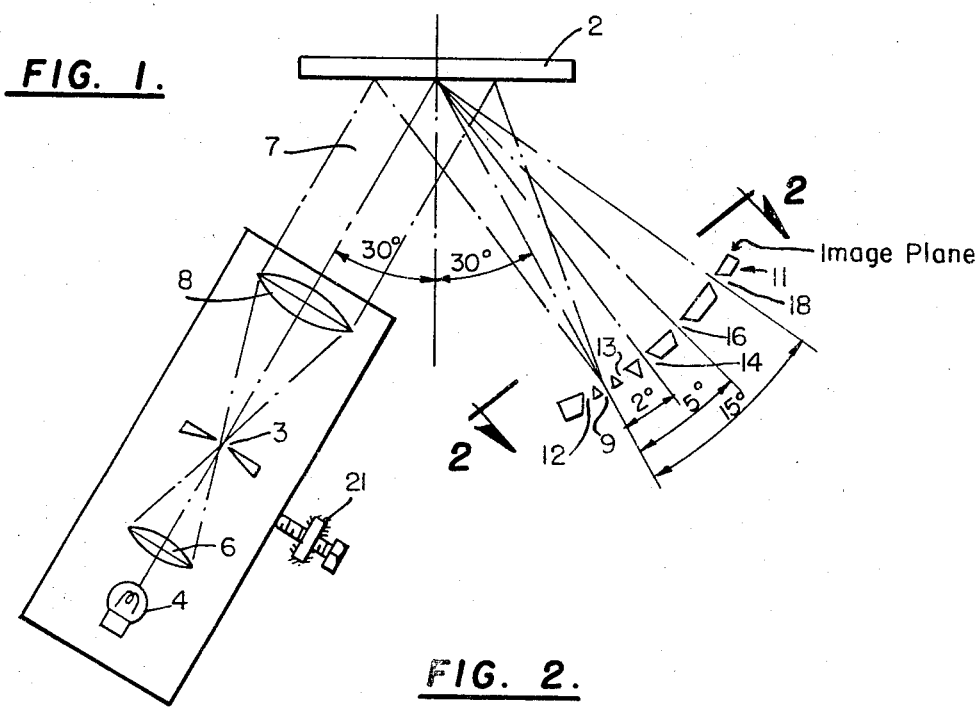
FIG. 1.
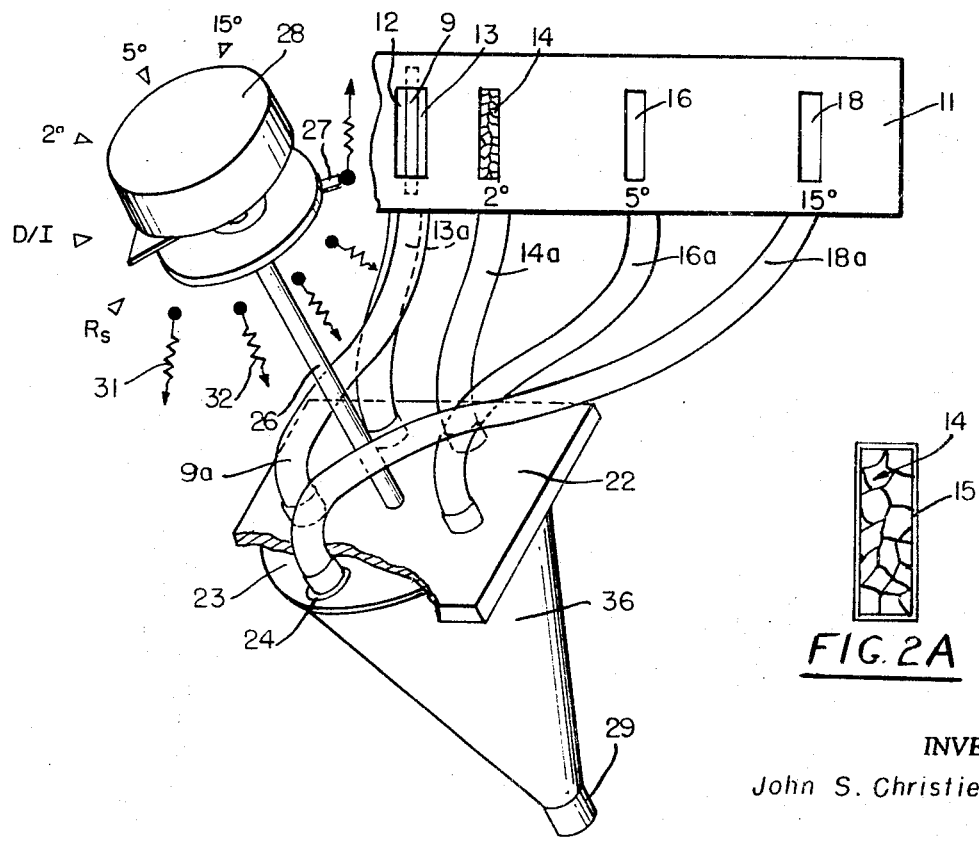
FIG. 2.
FIG. 2A
INVENTOR
John S. Christie
BY Max L. Libman
ATTORNEY Dec. 22, 1970  J. S. CHRISTIE  3,549,264
INSTRUMENT FOR MEASURING THE GEOMETRIC ATTRIBUTES OF
METALLIC APPEARANCE BY MEASURING LIGHT REFLECTED AT
VARIOUS ANGLES FROM A SURFACE
Filed Nov. 13, 1968  3 Sheets-Sheet 2
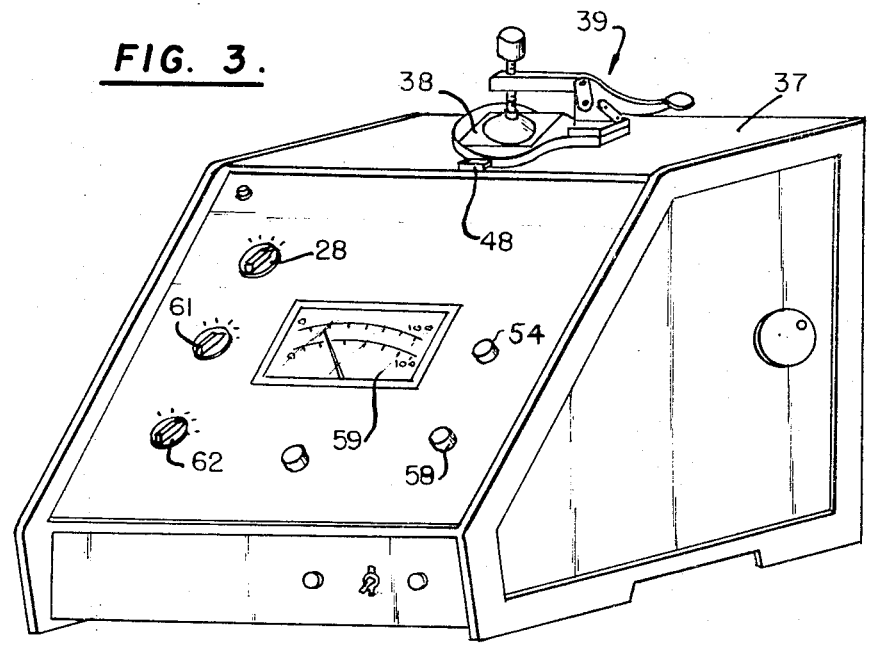
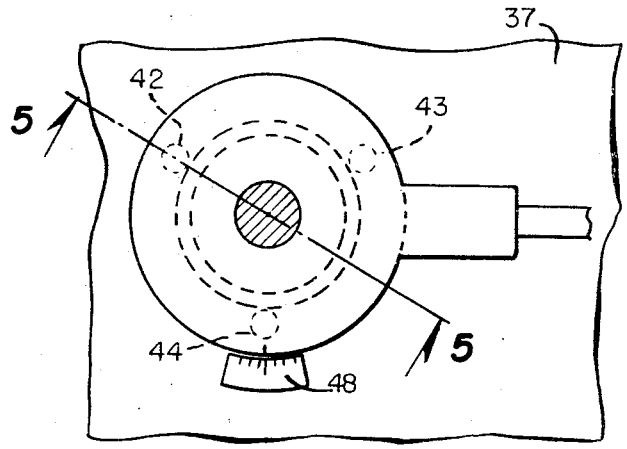
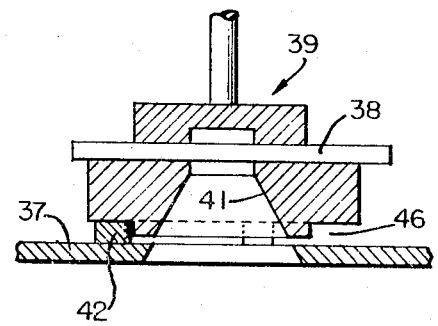
INVENTOR
John S. Christie
BY Max L. Libman
ATTORNEY

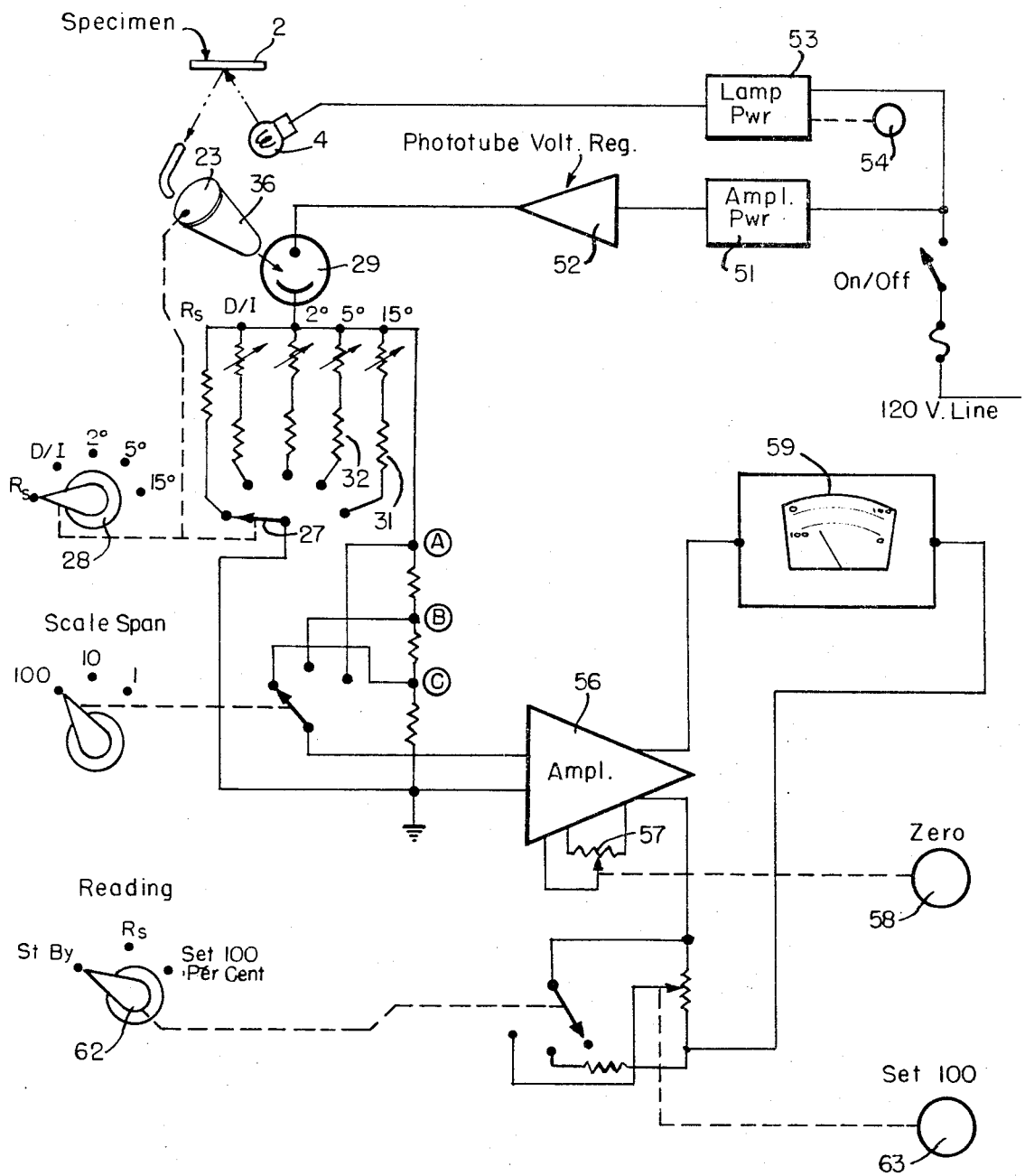

з,549,264
Patented Dec. 22, 1970

3,549,264
INSTRUMENT FOR MEASURING THE GEOMETRIC ATTRIBUTES OF METALLIC APPEARANCE BY MEASURING LIGHT REFLECTED AT VARIOUS ANGLES FROM A SURFACE
John S. Christie, McLean, Va., assignor to Hunter Associates Laboratory, Inc., Fairfax, Va., a corporation of Virginia
Filed Nov. 13, 1968, Ser. No. 775,274
Int. Cl. G01n 21/48
U.S. Cl. 356—210      7 Claims

ABSTRACT OF THE DISCLOSURE

A unitary instrument for providing quantitative values of surface appearance characteristics of bare metallic surfaces by measuring the geometric characteristics of reflectance related to appearance of such surfaces. The specific appearance attributes measured by the instrument are specular reflectance, distinctness of image, haze and diffuseness, all of the measurements being correlated within a single instrument having multiple light-receptor apertures and using fiber light-collector pipes to convey the light data to a single phototube which produces D.-C. output signals on a panel meter through solid state amplifier circuitry.

BACKGROUND OF THE INVENTION

The use of bare and clear coated metal surfaces has increased considerably in recent years because of their lower cost, attractiveness, and weather resistance. These surfaces are now used widely in places where they are judged for their appearance quality, such as in architectural application of large sheets to the exterior of buildings and on transportation equipment. The need for control of differences in appearance between individual parts of an item or vehicle is economically important, since lack of uniformity of appearance adversely affects the market value of the product.

In many applications, the most important appearance characteristic is metallic brightness; however, there are other characteristics associated with geometric distribution of light reflected from surfaces, such as mirror-like quality, directionality of surface texture, and luster. These are also economically important because of their relationship with continuity of surface coating, corrosion resistance, and, of course, customer preference.

Metals are optically quite different from pigmented products, such as paint, and from fibrous materials, such as paper and cloth. As a consequence, methods of appearance measurement developed for these materials are not generally suitable for metals. Various procedures have been proposed for the evaluation of metallic appearance, but these have not been widely used, partly because the apparatus required has not been easily available. It is a major object of the present invention to provide a relatively simple, easy-to-use piece of equipment which will give reliable and repeatable results directly and without requiring particular skill in operation.

An instrument for measuring the distinctness-of-image of metallic surfaces is described in U.S. Pat. No. 3,245,-306 to Potter et al., in which a single receptor slit is located midway between the mirror images of two source slits. The distinctness-of-image is measured by the amount of light reaching this single receptor slit relative to that received by the same slit when positioned in the center of one of the source images. It is also known in the art to employ a so-called "abridged goniophotometer" for measuring geometric attributes of metallic appearance, by the use of a single, fixed, incident beam and an adjustable receptor assembly so constructed that the amount of light at certain fixed angles, e.g. 2°, 5°, 15°, and 25° from the specular center line can be measured relative to the intensity of the specular beam. The present device combines the functions of both of the above types of measurement in a simplified manner in a single instrument, and in such a manner that the optical results of both tests are correlated to provide a set of numerical values which are all derived from a single test on a given specimen, and are repeatable and can be correlated with test results obtained from other goniophotometric measurements so that the numerical values of standards can be determined by absolute physical methods. In this way, long-term scale calibration between instruments can be assured.

SUMMARY OF THE INVENTION

The present instrument combines the functions of measuring distinctness-of-image and an abridged goniophotometer in a common optical system and housing. A converging-beam optical system is employed to direct a beam of light incident 30° from the perpendicular to a specimen being tested. Light from the source is directed through a single-source aperture slit by a condenser lens. An objective lens focuses an image of this source slit, reflected by the specimen, onto a receptor slit plane, which has six fixed aperture slits. The first receptor aperture is a single slit, equal in width to the source image. It measures specular reflectance ($R_s$). There are two distinctness-of-image slits, one on each side of and adpacent to the $R_s$ slit. In addition, there are three other off-specular apertures, all located on the greater-than-specular angle side of the $R_s$ slit. The first, for measuring narrow-angle haze, is centered 2° from the specular slit center line. The second, for measuring wide angle haze, is centered 5° from the specular slit center line, and the third, which measures diffuse reflectance, is centered 15° from the specular center line. Light from each receptor aperture is directed by light-transmitting fibers to a backing plate, where the ends of the fiber bundles are arranged on the arc of a circle. A rotatable mask with a single hole is located behind this plate, and is on a common shaft with a load selector switch, both rotatable by the angle selector (function) knob. In this manner, the desired optical attribute can be selected for measurement, by rotating the knob, so that light from the proper fiber bundle is permitted to reach the phototube and the proper calibrated load is at the same time introduced to the phototube circuit. The output of the phototube, properly amplified, is supplied to a meter which reads specular reflectance ($R_s$) directly. All other measurements are shown as percentages of specular reflectance. A specimen clamping turret is provided, which holds the specimen perfectly flat, as is essential for proper operation, the entire turret being positively maintained in a fixed plane determined by three magnetic positioning elements, on which the specimen can be rotated in its own plane to allow measurements both with and across any grain or machine direction of the specimen surface, while permitting the entire assembly to be removed from the instrument for visual examination of the specimen area being measured.

DESCRIPTION OF THE FIGURES

FIG. 1 is a schematic diagram illustrating the principle of the invention;

FIG. 2 is a schematic drawing of the selector knob for selecting the desired aperture and simultaneously switching the correct resistor into the circuit;

FIG. 2A is an enlarged view of the end of a typical light fiber bundle showing its relation to an aperture slit;

FIG. 3 is a perspective view of the invention showing the front panel and specimen clamp turret;

FIG. 4 is a plan view showing the lower portion of the specimen clamp turret in relation to the top of the unit;

FIG. 5 is a sectional view taken on line 5—5 of FIG. 4 and showing also a portion of the top part of the clamping unit; and FIG. 6 is a schematic circuit diagram showing typical circuitry employed in the invention.

DESCRIPTION OF THE INVENTION

Referring to FIG. 1, the lower surface of a specimen 2 which is to be measured has incident on its under side a beam of light from a source slit 3 through which is passed light from a lamp 4 and a condenser lens 6. If the surface of specimen 2 on which the beam of light 7 is projected at an angle of 30° were a perfect mirror, then a perfect image of the slit would be formed at the focus of lens 8, and the projecting system is adjusted so that this image coincides with a narrow slit 9 in a mask 11, and the light passing through the slit is measured by photometric system, as will be explained below, and is used as a basis of reference for comparison with light passing through other slits in the mask. However, as the surface being measured is practically never a perfect mirror and therefore some of the reflected light will also reach other portions of the mask 11 and will pass through slits 12, 13, 14, 16 and 18. Measurement of the light passing through these slits, relative to the light passing through slit 9, gives the desired criteria for evaluating the appearance characteristics of the surface being tested.

The width of the reference aperture slit is made equal in width to the image of the source slit 3, in a practical instrument, 0.012 inch. The two slits adjacent to this, 12 and 13, are located one on each side of and adjacent to slit 9. In addition, there are three other off-specular apertures, all located on the greater-than-specular angle side of slit 9. The first, which is slit 14, for measuring narrow angle haze is centered 2° from the specular slit center line, i.e., 2° from slit 9. The second, slit 16, for measuring wide angle haze, is centered 5° from the specular slit center line. The third, slit 18, measures diffused reflectance and is centered 15° from the specular center line. An incident-beam adjustment screw 21 is provided, to insure coincidence of the source image with the specular reflectance slit. This adjustment is necessary to correct for minute variations in specimen plane position and to minimize the effect of small specimen surface irregularities and curvatures encountered in normal operation of the instrument. It should be noted that the off-specular apertures such as 14, 16, etc., all could be as effectively located on the less-than-specular side of slit 9 as on the side shown. Also, slits on both sides can be paired as are slits 12 and 13. It has been found, however, that the locations described are adequate to give meaningful measurements.

Referring to FIG. 2, light from each of the receptor apertures which are here shown as slits 9, 12, 13, etc., in mask 11, is directed by light-transmitting fibers 9a, 12a, etc., to a backing plate 22, where the ends of the fiber bundles are arranged on the arc of a circle. A rotatable mask 23 with a single hole 24 is located behind this plate. It is arranged on a common shaft 26 with a load selector switch 27, both rotatable by the angle selector knob 28. In this manner the desired optical attribute can be selected for measurement. As the knob is rotated through the positions which permit the aperture 24 to be aligned with the respective fiber bundle ends, light from the proper fiber bundle is permitted to reach the phototube 29 and the proper calibrated load resistor 31, 32, etc., is introduced into the phototube circuit, as will be explained below.

When aperture 9 is uncovered, the meter reads specular reflectance ($R_s$) directly. All other measurements are shown as percentages of specular reflectance.

As shown in FIG. 2, light passing through the slit apertures falls upon the respective ends of fiber bundles serving in known fashion as light pipes 9a, 13a, 14a, etc., to bring light from the aperture slits to the phototube 29. The outlet ends of the fiber bundles are brought to backing plates 22, where it is convenient to arrange them uniformly on the circumference of a circle whereby aperture 24 in rotary mask 23 may conveniently be selectively rotated to expose any desired outlet end, and thus subject the phototube to light from any desired selected slit. A light-collecting pipe 36 of conical configuration transmits light from the end of the fiber pipe to the phototube 29 with negligible loss. In this manner, uniform rotation of the selector knob can select any one of the slits, whereas direct masking at the aperture slits would be more difficult to the very close spacing between slits 9, 12 and 13. With the above arrangement, it would of course also be possible to selectively pass light from more than one slit or receptor aperture simultaneously through the phototube, by providing more than one aperture 24 in rotatable disc 23. Another advantage of the light fibers is that a single ray entering a light fiber, due to the multiple internal reflections in the fiber, emerges as a cone of rays well mixed and diffused, which is desirable, since the photodetector surface tends to be nonuniform in its reception characteristics, and therefore it is best if the light is well diffused over its entire surface rather than concentrated on small areas of the photodetector surface.

It is desirable to use as large a diameter of individual fiber as possible to increase the transmission efficiency and to reduce the number of fibers that need to be handled during assembly, since this is a manual assembly operation. A practical size of individual fibers for use in making up the light pipe of many fiber strands is 0.010 inch, and a suitable material available in this size is Du Pont Crofon. Since the diameter of the individual fibers in this case is only a little less than the width of the smallest slit, it will be apparent that the interstices between adjacent light fibers, even when they are packed as closely together as possible, will represent an appreciable portion of the slit area, and this would cause an appreciable loss of resolution, since the light entering the interstices would not reliably emerge from the far end of the light fiber bundle. To eliminate this, the fibers are heat softened at the aperture end and compressed to form a solid mass corresponding in outline to the aperture shape, as shown in FIG. 2A, so that the entire aperture is filled with solid fiber ends and no light is wasted in the open spaces between circular fibers. However, this could result in some loss of light at the outside walls of the thus-created solid aperture end bundle, and to overcome this, the end walls are surrounded with a layer of material having a suitable index of refraction, sufficiently below 1.5, which is the index of refraction of the Lucite fibers employed, to produce the desired internal reflection. In a practical application, a layer 15 (FIG. 2A) of FEP Teflon film, 0.001 or 0.0005 inch thick, is applied to the external surface of the fused fiber end. Teflon is particularly suitable for this purpose because it can withstand fairly high temperatures and has a suitable index of refraction. In this manner, all of the light falling upon the aperture is transmitted, with only the unavoidable very small losses which normally occur in transmission, to the outlet end of the fiber light pipe.

As shown in FIG. 3, the entire unit is housed in a suitable casing, and the specimen is viewed through a suitable aperture in the top wall 37 of the casing, as shown also in FIG. 5. The specimen 38 (FIG. 5) is clamped into specimen clamp turret 39, where it is held against well-machined flat surfaces under adjustable pressure by any suitable mechanism, in this case, by a toggle arrangement which can be quickly released. The bottom clamp member 41 of the turret is firmly positioned on the top wall of the casing by three magnets 42, 43, 44, ring 41 being made of magnetic material for this purpose, and being annularly recessed as shown at 46, so that the three magnets also serve to accurately center the turret over the aperture in top wall 37. Furthermore, this arrangement permits the turret to be rotated so that measurements with and across the grain or machining of the specimen can be made at any desired angle, and to assure accurate angular positioning of the turret, a specimen rotation index indicator 48 is provided on the top wall 37.

For the initial calibration of the instrument, a perfect mirror or alternatively a perfect diffuser can be placed in the specimen clamp turret and the resulting reading used as a reference point.

Since a single aperture is not used for all the measurement in this instrument, as in some prior art devices, an equivalent response is established between apertures at the phototube, by the use of different load resistors at each aperture switch position, as explained above. This avoids the need to use intermediate standards which are, especially for distinctness-of-image work, unreliable, nonuniform, and difficult to maintain.

FIG. 6 shows a schematic measuring circuit useful with the above-described instrument. The reference characters employed to describe the phototube and the control units are the same as those shown in FIG. 3. The phototube 29 is supplied from power supply 51 through a phototube voltage regulator 52 which provides very close regulation, and in practice is preferably of the boot-strap type. Suitable means are also provided for adjusting the lamp power supply 53, as indicated by the standardizing control 54. When selector knob 28 is rotated to the desired position, as explained above, a suitable load resistor 31, 32, etc., is inserted into the circuit by means of selector switch 27, which is actuated by the selector knob. The output of the photodetector is then amplified at 56, which is preferably a two-stage differential amplifier using two field effect transistors which give extremely high input impedance and therefore have the ability to measure very small current signals such as are obtained from the photodetector. Meter zero reading is controlled by balancing the input current drain of the two field effect transistors through a divider 57, under control of zero knob 58. The output of the amplifier is read on meter 59. Scale selector switch 61 controls the scale sensitivity in customary fashion, and reading switch 62 is provided which in the $R_s$ position, includes the full potentiometer resistance so that the meter reads with minimum sensitivity. When the reading switch is in the SET, 100%, position, the potentiometer slider is active and therefore the meter sensitivity can be increased by the use of the SET 100 knob 63. This allows expansion of any specular reflectance value (as long as it is greater than $\frac{1}{10}$ full scale) to a meter indication of 100. Following this operation, the values of distinctness of image, to percent, etc., are read off directly as percentages of specular reflectance.

I claim:

1. (a) A photometric instrument for measuring appearance characteristics of shiny metalic surfaces comprising
   (b) clamping means for mounting a specimen to be tested with an exposed surface rigidly held in a flat plane,
   (c) a source mask having a narrow source slit and image-forming means for projecting a focussed beam of light through said slit toward said exposed surface,
   (d) an image mask in the focal plane of the reflected beam of said light, said mask having a primary slit corresponding in width to said source slit image and located to receive the reflected image of said primary slit,
   (e) said image mask having secondary slits generally parallel to said primary slit and located at various distances from said primary slit for receiving scattered light from said beam of light reflected from said surface,
   (f) photodetector means for measuring the intensity of light,
   (g) flexible light pipe means for transmitting light from said primary and secondary slits, each of said light pipe means having a light-receiving end at one said slits and a light-transmitting end arranged and directed to pass light from its associated slit to said photodetector means, the spacing of the light receiving ends being different from the spacing of the slits on the image mask,
   (h) movable mask means between said light-transmitting ends and said photodetector means, said mask means having at least one aperture means, said mask means being movable so as to present said aperture means to a selected light-receiving end to permit only light from a selected light-receiving end or ends to fall on said photodetector means so as to selectively measure reflected light passing through said image slit.

2. The invention according to claim 1,
   (i) said instrument being enclosed in a light-tight close to and on either side of said primary slit for measuring distinctness of image by comparison of light received by said two slits with light received by said primary slit.

3. The invention according to claim 2,
   (j) others of said secondary slits being wider than said primary slit and located at increasing angles of reflection.

4. The invention according to claim 1,
   (i) said instrument being enclosed in a light-tight housing having a specimen aperture adjacent which said clamping means is mounted in light-tight fashion so as to present a surface being tested to said beam of light,
   (j) there being three magnets fixed to said housing and spaced around the edge of said aperture, said magnets being equidistant from the center of said aperture, said clamping means having an annular bottom surface of magnetic material held by magnetic attraction against said magnets,
   (k) said clamping means being rotatable about the center of said aperture while retained against said magnets to adjust the angular relationship of a retained specimen.

5. The invention according to claim 1, said photodetector means including an electric measuring circuit, a number of circuits adjusting means associated with said movable mask means and movable therewith to associate different ones of said circuit adjusting means with said measuring circuit as light from the different slits is presented to said photodetector.

6. The invention according to claim 1, said circuit adjusting means being load resistor means, said movable means being rotatably mounted on a shaft to select different slits for measurement, and selective slit means actuated by rotation of said shaft to select appropriate load resistor means as different slits are selected by rotation of said shaft.

7. The invention according to claim 1, each of said light pipes being made up of a number of individual circular light-transmitting fibers, the light-receiving end of at least one of said light pipes being compressed into the shape of the slit with which it is associated so as to correspond closely to the slit aperture, the round fibers being distorted by compression so that they are in close contact with adjacent fibers without leaving any open spaces between them, and an external layer surrounding said mass of fiber ends, said layer being of a material having a suitable index of refraction to provide total internal reflection for said mass of fiber ends, of any light reaching said fiber ends through the associated slits.

References Cited

UNITED STATES PATENTS 1,949,619  3/1934  Pfund _____ 356—212
2,463,321  3/1949  Scott _____ 356—212
3,467,774  9/1969  Bryant _____ 350—96(B)

RONALD L. WIBERT, Primary Examiner

O. B. CHEW II, Assistant Examiner

U.S. Cl. X.R.

250—220, 227